United States Patent Office 2,895,963
Patented July 21, 1959

2,895,963
4-METHYL-6:7-BIS-β-DIETHYLAMINO-ETHOXY COUMARIN

Guido Cavallini and Elena Massarani, Milan, Italy, assignors to Maggioni & C. Societa per Azioni, Milan, Italy, a company of the Italian Republic No Drawing. Application May 31, 1957
Serial No. 662,586

Claims priority, application Italy June 5, 1956

2 Claims. (Cl. 260—343.2)

This invention relates to the preparation of 4-methyl-6:7-bis-[beta diethylamino-ethoxy]-coumarin which is valuable in medicine as it intensively counteracts the fragility of the capillaries.

Preliminary pharmacological tests have been carried out on animals (guinea pigs) in order to determine the variations of the capillary resistance.

The test technique consisted in administering either per os or per intraperitoneal route, the hydrochloride of the compound of the invention and checking the capillary resistance by means of suitable dry cups, applied to the skin, in which an increasing negative pressure is exerted until a blister is produced on the skin of the treated animals. The hydrochloride of 4-methyl-6:7-bis-[beta-diethylamino-ethoxy]-coumarin was administered for three days after carefully checking the normal capillary resistance. This is indicated by the mm. Hg of negative pressure sufficient to produce the skin hemorrhages.

The following table summarizes the experimental data:

| Individual dose in mg. per kg. | | Capillary resistance, mm. of Hg average of 2-3 determinations (negative pressures) | Increase of capillary resistance with respect to the untreated animals in percent |
|---|---|---|---|
| Per os | Intraperitoneally | | |
| | | [1] 197 | |
| 1 | | 200 | 15 |
| 10 | | 245 | 22 |
| | 1 | 257 | 30 |
| | 10 | 310 | 57 |

[1] Untreated.

Another object of the present invention is to prepare the quaternary salts of the compound referred to above.

Generally stated, the process of this invention comprises the steps of preparing the 6:7 disodium salt of 4-methyl-6:7-dihydroxy-coumarin, reacting said salt with beta-diethylamino-ethane chloride, discarding the inorganic salt formed in the course of the reaction and collecting 4-methyl-6:7-bis-[diethylamino-ethoxy]-coumarin. In place of the sodium salt of 4-methyl-6:7-dihydroxy-coumarin, the salt of another alkali metal can be employed. More particularly 1 molecular proportion of 4-methyl-6:7-dihydroxy-coumarin dissolved in an inert organic solvent is refluxed for about 30 minutes with two molecular proportions of a caustic alkali such as NaOH, the reaction is continued at reflux temperatures for 5 additional hours and during the first of these 5 hours two molecular proportions of beta-diethylamino ethane chloride are dropped into the reaction vessel. Two molecular proportions of sodium chloride are formed, which are collected on a filter and discarded: 4-methyl-6,7-bis-[beta-diethylamino-ethoxy] - coumarin remains in the filtrate.

The solvent is removed from the filtrate by evaporation, the residue is distilled and the fraction passing between 252° C. and 260° C. under an absolute pressure of 4 mm. of mercury is collected.

The reaction takes the following course:

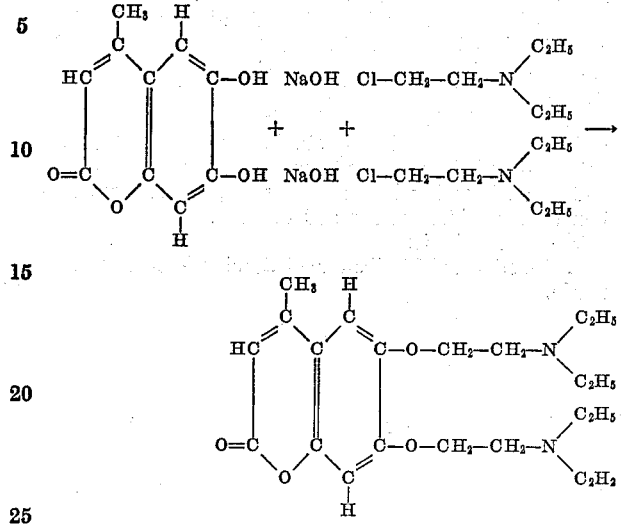

The process of the invention is illustrated by the following example.

Example 1

A three-necked flask, equipped with reflux condenser, dropping funnel and stirrer, is charged with 9.6 grams of 4-methyl-6:7-dihydroxy coumarin, 4 grams of finely ground sodium hydroxide and 120 cc. of anhydrous acetone. The mixture is refluxed for 30 minutes on a steam bath. Then, 15 grams of diethylamino ethane chloride are added in drops to the boiling mixture along an hour: refluxing is further continued for four hours. At the end of this period, the formed sodium chloride is collected on a filter and discarded, the solvent is evaporated and the residue is distilled, collecting the fraction passing between 252° C. and 260° C. under an absolute pressure of 4 mm. of mercury. 14.4 grams of 4-methyl-6:7-bis-[beta-diethylamino-ethoxy] - coumarin are obtained and the yield is 75% of theory. The corresponding hydrochloride can be prepared by reacting 4-methyl-6:7-bis-[beta-diethylamino-ethoxy] - coumarin, in solution, e.g. ethereal solution, with anhydrous hydrogen chloride. The hydrochloride, when crystallized from anhydrous isopropyl alcohoi, has a M.P. of 178° C. and is soluble in cold methanol and ethanol, in hot water and chloroform, whereas it is insoluble in acetone, ethyl ether, carbon tetrachloride and benzene.

In the following, the preparation of quaternary salts of 4-methyl-6:7-bis-[beta-diethylamino-ethoxy]-coumarin will be particularly illustrated.

When 4 - methyl-6:7-bis-[beta-diethylamino-ethoxy]-coumarin dissolved in an inert anhydrous organic solvent, is reacted with an alkyl halide, the corresponding quaternary salt is readily obtained. For example, by reacting 4-methyl-6:7-bis-[beta - diethylamino - ethoxy]-coumarin with methyl iodide, one obtains the compound:

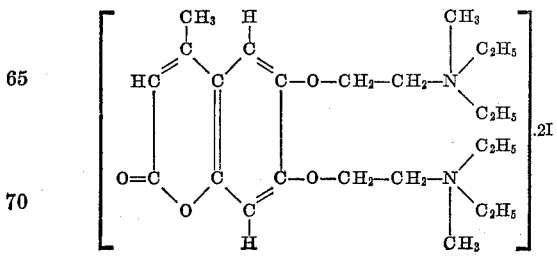

An example of preparation of a quaternary salt is the following:

Example 2

A three-necked flask equipped with condenser, dropping funnel and stirrer is charged with 3.9 grams of 4-methyl-6:7-bis-[beta-diethylamino-ethoxy]-coumarin and 20 cc. of anhydrous ethanol, and 5-6 grams of methyl iodide are dripped therein with stirring. The mixture is heated on a steam bath for 15 minutes. The bis-methyl-diethyl-beta-(6:7-hydroxy-4-methyl-coumarin)-ethyl ammonium di-iodide crystallizes on cooling on an ice-bath, and is recrystallized from anhydrous ethanol. The yield is 6.3 grams, that is, 90% of theory. A white crystalline product is obtained, which has a M.P. 217° C.–218° C. is soluble in cold water, in hot methanol and ethanol, and is insoluble in ether, chloroform, carbon tetrachloride, acetone and benzene.

What we claim is:

1. 4-methyl-6:7-bis-(beta-diethylamino-ethoxy)-coumarin.

2. A process for preparing 4-methyl-6:7-bis(beta-diethylamino-ethoxy)-coumarin: which comprises refluxing, in solution an inert organic solvent, one molecular proportion of 4-methyl-6:7-dihydroxy-coumarin with one molecular proportion of an alkali metal hydroxide for about 30 minutes, continuing refluxing for 5 additional hours while adding during the first of said 5 additional hours, two molecular proportions of diethylamino ethane chloride, filtering off the resulting inorganic salt, removing the solvent from the filtrate, distilling under reduced pressures the residue and collecting that fraction of the distillate which boils between 252° C. and 260° C. under an absolute pressure of 4 mm. of mercury.

References Cited in the file of this patent

UNITED STATES PATENTS 2,544,076     Forneau                Mar. 6, 1951